United States Patent
Van Dalfsen (10) Patent No.: US 6,671,006 B1
(45) Date of Patent: *Dec. 30, 2003

(54) SPOT POSITION INDICATION SIGNAL GENERATION

(75) Inventor: Age J. Van Dalfsen, Eindhoven (NL)

(73) Assignee: Koninklijke Philips Electronics N.V., Eindhoven (NL)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 878 days.

(21) Appl. No.: 08/843,978

(22) Filed: Apr. 18, 1997

(30) Foreign Application Priority Data

Apr. 26, 1996 (EP) ............................................ 96201137

(51) Int. Cl.[7] .............................. H04N 3/22; H04N 9/24
(52) U.S. Cl. ..................... 348/806; 348/811; 315/370
(58) Field of Search ................................. 348/806, 807, 348/745, 746, 747, 190, 811, 812; 315/368.11–368.26, 369, 366, 367, 371, 382, 370, 382.1, 364; H04N 9/24, 3/22

(56) References Cited

U.S. PATENT DOCUMENTS

| | | | | |
|---|---|---|---|---|
| 4,314,179 A | | 2/1982 | Tooyama et al. | 315/12.1 |
| 4,499,457 A | * | 2/1985 | Hintze | 345/22 |
| 4,684,996 A | * | 8/1987 | Baumeister | 348/747 |
| 4,695,772 A | * | 9/1987 | Lau et al. | 315/370 |
| 4,771,334 A | * | 9/1988 | Bolger | 348/806 |
| 4,797,619 A | * | 1/1989 | Austin et al. | 324/409 |
| 4,896,081 A | | 1/1990 | Ichigaya et al. | 315/368.18 |
| 4,925,420 A | * | 5/1990 | Fourche et al. | 445/3 |
| 5,016,095 A | * | 5/1991 | Kii | 348/806 |
| 5,111,284 A | * | 5/1992 | Tsujihara et al. | 348/747 |
| 5,194,783 A | * | 3/1993 | Ogino et al. | 315/368.13 |
| 5,216,497 A | * | 6/1993 | Tsujihara et al. | 348/745 |
| 5,345,280 A | * | 9/1994 | Kimura et al. | 348/745 |
| 5,398,083 A | * | 3/1995 | Tsujihara et al. | 348/807 |
| 5,463,427 A | * | 10/1995 | Kawashima | 348/806 |
| 5,504,496 A | * | 4/1996 | Tanaka et al. | 345/32 |
| 5,519,447 A | * | 5/1996 | Shima et al. | 348/556 |
| 5,532,765 A | * | 7/1996 | Inoue et al. | 348/807 |
| 5,592,240 A | * | 1/1997 | Sakamoto et al. | 348/807 |
| 5,657,079 A | * | 8/1997 | Thario et al. | 348/190 |
| 5,694,181 A | * | 12/1997 | Oh | 348/807 |
| 5,739,870 A | * | 4/1998 | Simpson | 348/628 |
| 5,793,340 A | * | 8/1998 | Morita et al. | 345/7 |
| 5,793,447 A | * | 8/1998 | Fujiwara et al. | 348/807 |
| 5,838,396 A | * | 11/1998 | Shiota et al. | 348/745 |

* cited by examiner

Primary Examiner—Michael H. Lee
(74) Attorney, Agent, or Firm—Edward W. Goodman

(57) ABSTRACT

An spot position indication signal (A) is generated by an address generator (4). A deflection current (Ih,Iv) for deflecting an electron beam spot in one direction in a raster scanned cathode ray tube (2) has a shape for obtaining an approximate linear scan in the one direction. The address generator (4) supplies an spot position indication signal (A) which is related to the spot position if:

the spot position indication signal (A) is a linear function in time: $A(t)=A0+dA.t$, and two predetermined (desired) addresses (A1,A2) occur at two selected levels (I1,I2) of the deflection current to which belong two positions on the picture tube screen.

8 Claims, 5 Drawing Sheets

SPOT POSITION INDICATION SIGNAL GENERATION

BACKGROUND OF THE INVENTION

1. Field of the Invention

The invention relates to a method and a circuit for generating a spot position indication signal in a cathode ray tube display arrangement, in which displays are realized by line-by-line scanning of a display screen of a cathode ray tube by an electron beam spot, the cathode ray tube display arrangement comprising a deflection circuit for generating a deflection current to deflect the electron beam spot in a first direction, wherein the deflection current has a shape for obtaining an approximately linear scan on the display screen in the first direction during a scan period.

The invention also relates to a cathode ray display apparatus comprising such a circuit for generating a spot position indication signal.

Such a spot position indication signal may be used for generating position dependent waveforms for correcting deflection errors of the cathode ray tube, such as convergence errors or east-west distortions, or for use as a dynamic focusing waveform, or as a waveform influencing the brightness of a displayed picture to compensate for brightness non-uniformity on the cathode ray tube.

2. Description of the Related Art

It is known to obtain a line position indication signal which indicates the vertical sport position on a raster scanned display screen for every line by using an analog-to digital converter (further referred to as ADC). The ADC measures a value of tile vertical deflection current at a moment a line occurs. The vertical position of the spot, and thus of a line on the display screen is determined by the value of the vertical deflection current in this line. Hence, the ADC supplies a line position indication signal that is a measure of the vertical position of the spot on the screen. If a repetition frequency, or an amplitude, of the vertical deflection current changes, still the ADC supplies the actual vertical spot position at the moment a line occurs as the vertical spot position is still determined by the vertical deflection current. For example, in convergence circuits using the output signal of the ADC for calculating convergence waveforms, the ADC must have a resolution of approximately 13 bits for display systems displaying about 600 lines. A striping would become visible on the screen if a lower resolution would be used. This striping is a brightness modulation caused by different distances between adjacent lines due to inaccuracy in the position of the lines. Such a high resolution ADC is expensive.

SUMMARY OF THE INVENTION

It is an object of the invention to provide a simple and cheap spot position indication signal.

To this end a first aspect of the invention provides a method for generating a spot position indication signal characterized in that the method comprises the steps of generating, in a certain scan period, a position information being related to the deflection current; measuring a first moment in time at which the position information has a first value; measuring a second moment in time at which the position information has a second value; calculating, in a later scan period, the spot position indication signal as a linear function in time whereby, in a steady state situation, the spot position indication signal has predetermined position indication values at corresponding first and the second moments in time in this later scan period, respectively.

A second aspect of the invention provides a circuit for generating a spot position indication signal the circuit receiving a deflection current for scanning an electron beam spot in a first direction along a display screen of a cathode ray tube line by line, wherein the deflection current has a shape for obtaining an approximately linear scan on the display screen in said first direction, characterized in that the circuit comprises means for generating, in a certain scan period, a position information being related to the deflection current; means for measuring a first moment in time at which the position information has a first value; means for measuring a second moment in time at which the position information has a second value; means for calculating, in a later scan period, the spot position indication signal as a linear function in time whereby, in a steady state situation, the spot position indication signal has predetermined position indication values at corresponding first and the second moments in time in this later scan period, respectively.

A third aspect of the invention provides a cathode ray tube display apparatus comprising a circuit for generating a spot position indication signal characterized in that the circuit for generating a spot position indication signal comprises means for generating, in a certain scan period, a position information being related to the deflection current; means for measuring a first moment in time at which the position information has a first value; means for measuring a second moment in time at which the position information has a second value; means for calculating, in a later scan period, the spot position indication signal as a linear function in time whereby, in a steady state situation, the spot position indication signal has predetermined position indication values at corresponding first and the second moments in time in this later scan period, respectively.

The invention offers a very simple and inexpensive method for generating a position indication signal representing the spot position on the screen of a cathode ray tube.

It is important to know the actual position of the spot if a waveform has to be generated which should be a function of the position on the screen. This means that at a certain position on the screen, a certain associated value of the waveform must occur. Such a position dependent waveform may be used to correct for position dependent geometry errors, such as east-west, north-south or convergence distortions, or to correct for brightness non-uniformity across the screen, or for obtaining a position dependent scan velocity modulation.

It is common practice to generate the position dependent waveform as a function of a variable depending on the time or a line number. The position dependent waveform which is generated in this way depends on the amplitude and the frequency of the horizontal or vertical deflection. For example, suppose, that the cathode ray tube display arrangement displays a PAL-picture with 625 lines which has a vertical amplitude suitable to scan the screen along the whole height. A position dependent waveform depending on time is generated to obtain a certain correction, for example, an east-west correction. This waveform has a suitable shape and extends, during a vertical scan period, over the whole vertical height of the screen. If, then, the amplitude of the vertical scan is decreased to scan only a part of the height of the screen, the generated position dependent waveform will have the same suitable shape extending daring the same vertical scan period, but now across only part of the height of the screen. As such, the values of the position dependent waveform occur at a wrong position, as now the same correction is performed on a smaller part of the screen. At different vertical frequencies for example: 50 Hz PAL, 60 Hz NTSC, and 45 Hz free running), a different total number of lines appears (as the line frequency does not change significantly) and thus, a different position dependent waveform is generated as the lines at different vertical frequencies appear at different positions on the screen.

Thus, the position address should be related to the vertical spot position at a moment a line in the picture occurs, to obtain a position dependent waveform independent of the frequency and amplitude of the vertical deflection. A same reasoning holds for a position waveform depending on the horizontal position on the screen.

DEFINITION OF POSITION INFORMATION SIGNAL

The invention provides a position information signal (further referred to as address) generator based on the insight that the spot position on the screen is a linear function in time. The spot position is a linear function in time if the deflection current has a shape for obtaining a linear scan on the picture tube screen. Further, use is made of the fact that a certain deflection current corresponds to a certain position on the picture tube screen. As, in case of a linear scan, the spot position on the screen is a linear function of time, the address generator should generate an address which is a linear function in time. The address generator supplies an address which represents the spot position on the screen if the linear function in time representing the address is coupled to the linear function in time representing the spot position. Thus, the address generator supplies an address which is related to the spot position if two predetermined (desired) address values occur at two selected levels of the deflection current to which belong two positions on the picture tube screen. The actual value of an address at a certain moment depends on the choice of the predetermined address values which have to occur at the selected positions on the screen. Therefore, the invention determines, in one scan period, a first and a second moment in time at which a first and a second selected level of the deflection current is reached, respectively. The address which is generated as a linear function is related to the spot position if at the first and second moments in time, in a steady state, the address has the predetermined address values (position indication values), respectively.

An embodiment of a method for generating a spot position indication signal (or address) according to the invention, measures the two moments in time at which the two selected levels of the deflection current occur in a simple way. The count value occurring at the moment that a corresponding one of the selected levels is reached is stored.

In another embodiment of the method according to the invention, the address is written as a linear function in time which comprises an initial position indication value (further referred to as initial value) added to an incremental value multiplied with the time. The initial value and the incremental value used in a certain scan period are determined from two linear equations. The two linear equations are obtained by substituting, in the linear function representing the address, the two moments or the two mean values of these moments on which the deflection current reaches the two selected values in the preceding scan period, and the above mentioned predetermined address values at these moments, respectively. In this way, the address in the certain scan period is generated based on the initial value and the incremental value obtained in an easy way from the two linear equations.

In another embodiment of the method according to the invention again, the address is written as a linear function in time which comprises the initial value added to the incremental value multiplied with the time. Now, the initial value and the incremental value used in a certain scan period are determined in a closed loop manner. Therefore, the first and second values of the address occurring at the first or second moment, are determined. These first and second addresses are compared with the predetermined address values, respectively. The initial value and the incremental value for use in the certain scan period are determined from the difference between these first and second addresses as occurring in a preceding scan period and the predetermined address values. The determination of the initial value and the incremental value can be performed in numerous ways depending on the requirements that the method for generating an address has to fulfill. An advantageous embodiment is described in the description of the Figures.

Another embodiment of the method, according to the invention, generates the address in a certain line by adding the incremental value to the address of the preceding line. In this way the multiplication of the incremental value with the time is replaced by a simple addition.

BRIEF DESCRIPTION OF THE DRAWINGS

These and other aspects will be described and elucidated with reference to the accompanying drawings. In the drawings.

DESCRIPTION OF THE PREFERRED EMBODIMENTS

Figure 1:
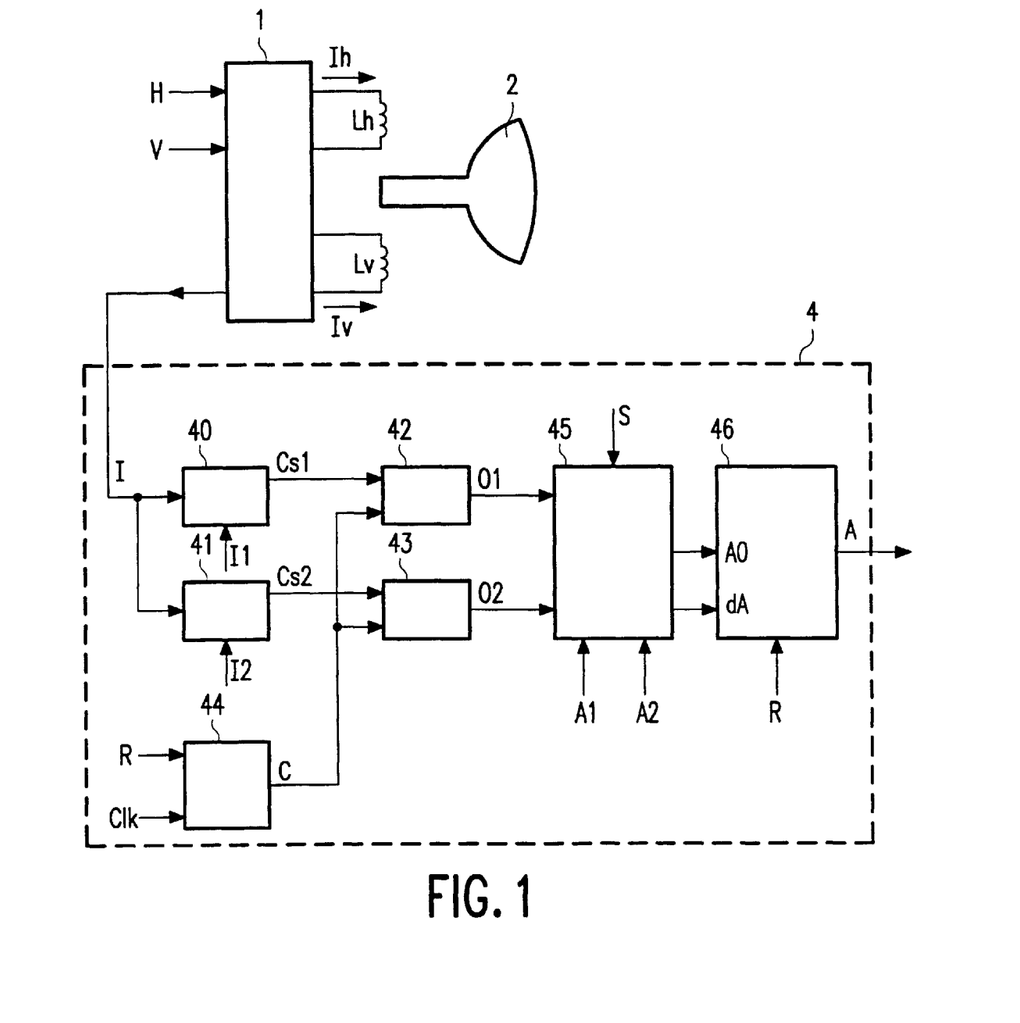
FIG. 1 shows a cathode ray display apparatus with a position indication signal generator according to the invention.

FIG. 1 shows a cathode ray display apparatus with a position indication signal (or address) generator 4 according to the invention.

Figure 2:
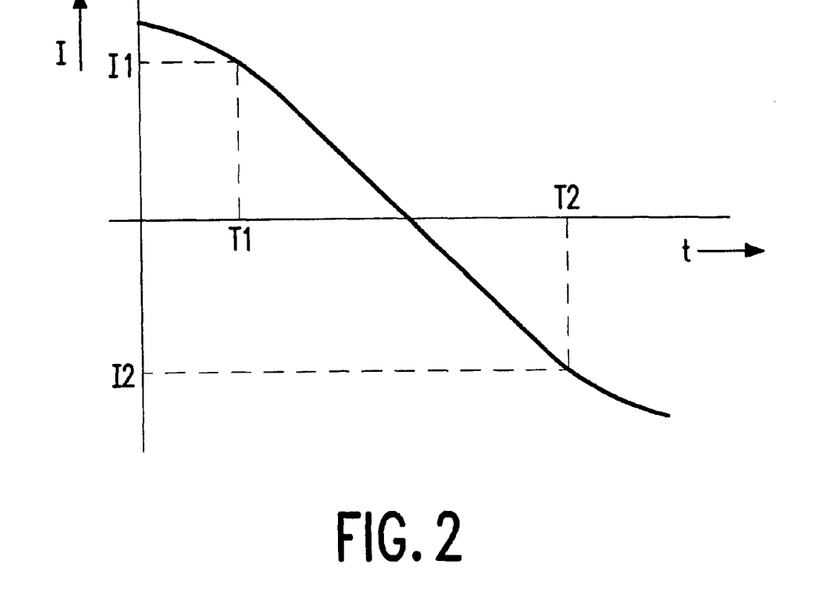
FIG. 2 shows a waveform of a deflection information being related to a deflection current.
Figure 3:
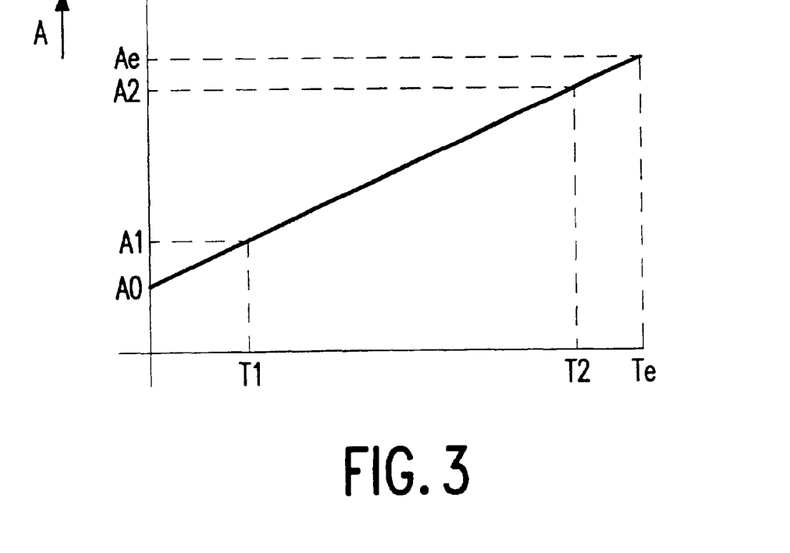
FIG. 3 shows a waveform representing, the position indication signal.

FIGS. 2 and 3 show waveforms elucidating the operation of the address generator 4. FIG. 2 shows a waveform of a position information I being related to a deflection current Ih;Iv. The deflection current Ih;Iv may be the vertical Iv or horizontal Ih deflection current.

The address generator 4 has to supply an address A which is a linear function in time, as is shown in FIG. 3:

$$A(t)=A0+dA.t$$

wherein A0 is an initial value and dA is an incremental value.

The address A is related to the spot position if two desired addresses A1,A2 occur at two selected levels of the deflection current Ih;Iv. This holds if the deflection current Ih;Iv has a shape for obtaining a substantial linear scan on the screen of the cathode ray tube 2. As, under this condition, the spot position on the screen is a substantial linear function in time.

The address generator 4 generates the address A every scan period, the time t being relative within each scan period.

Two positions on the screen belong to two selected levels of the deflection current Ih;Iv. These two selected levels of the deflection current are represented by two levels I1,I2 of the position information I, see FIG. 2. These two levels I1,I2 occur at two moments T1,T2, respectively. The address A is generated to obtain the two desired addresses A1,A2 at the two moments T1,T2, respectively. This will be further elucidated below.

An address generator 4 according to the invention as is shown in FIG. 1, comprises a first and a second comparator 40,41 both receiving a position information I which is related to the deflection current, and each receiving a reference level indicating the two levels I1,I2 for supplying a first and second comparator signal Cs1, Cs2, respectively, to a first and a second latch 42,43. The position information I may, for example, be obtained (not shown) in a known manner from the deflection current Ih;Iv via a current transformer, or a resistor through which the deflection current flows, or, if the deflection current Ih;Iv is generated by a power amplifier in a feedback loop, by a reference waveform to which the deflection current Ih;Iv is compared. Instead of the latches 42,43 any other storage circuit may be used.

A counter 44 receives a reset signal R being active during a flyback period of the deflection current, and a clock signal Clk which is summed during the trace period to obtain a count value C which is supplied to a further input of both the first and second latch 42,43. A first calculation unit 45 receives an output value O1 from the first latch 42, and an output value O2 from the second latch 43, to calculate the initial value A0 and the incremental value dA. The first calculation unit 45 receives a start information S indicating that new initial and incremental values A0,dA have to be calculated. The start information may be related to the second moment T2, as after this second moment T2, all necessary information for the calculation is available. The start information may also be the reset signal R. A second calculation unit 46 calculates the address A to supply the address A according to the expression:

$$A(t)=A0+dA.t.$$

The second calculation unit 46 receives the reset signal R indicating that the new initial and incremental values A0,dA calculated by the first calculation unit 45 have to be used to calculate the address A in a next scan period (field or line). It is possible to combine the first and second calculation units 45,46 in one calculation unit. If the address A represents a vertical position of horizontal scanned lines, the above expression may be written as:

$$A(\text{line})=A0+\sum_{i=1}^{i=\text{line}} dA$$

wherein the address A is calculated to be the initial value A0 to which is added, in every line, the incremental value dA. In this case, the second calculation unit 46 only needs to perform an addition in every line instead of multiplying the incremental value dA with the time t.

The first and second comparator signals Cs1,Cs2 indicate two moments in time T1,T2 (FIG. 2) at which two selected levels I1,I2 of the position information I occur, which correspond to the two selected levels of the deflection current Ih;Iv. A first count value C1 generated by the counter 44 is stored by the first latch 42 at the moment T1 that the first comparator signal Cs1 indicates that the position information I has the first selected value I1. The second latch stores in the same way a second count value C2 at the moment that the second comparator 41 indicates that the position information I has the second selected value I2. The clock signal CLK needs to have a sufficient high repetition rate to be able to obtain sufficiently accurate count values C1 and C2. The first calculating unit 45 calculates the initial value A0 and the incremental value dA from the first and second stored values C1,C2 knowing that these values represent the time moments T1,T2 at which the wished address values A1 and A2 should occur, respectively. The initial value A0 and the incremental value dA are defined by the formulae:

$$A0=(T1.A2-T2.A1)/(T1-T2)$$

$$dA=(A1-A2)/(T1-T2)$$

These formulae follow from a substitution of the measured moments T1,T2 and the desired address values A1,A2 occurring at these moments in the linear function representing the address A. Hence, an address generator is realized for calculating, with the second calculation unit 46, an address A from the initial value A0 and the incremental value dA in such a way that, in a steady situation, at the moment the first comparator 40 detects a first selected level of the deflection current, the address A is equal to the first desired address value A1, and that at the moment the second comparator 41 detects a second selected level of the deflection current, the address A is equal to the second desired address value A2. The selected values of the deflection current Ih;Iv have to be selected such that in every display mode for example, a vertical compress mode to display pictures having a 16:9 aspect ratio on a picture tube having a 4:3 aspect ratio), the deflection current Ih;Iv covers these values. Preferably, the selected values of the deflection current Ih;Iv are selected as far away as possible from each other to obtain a maximal accuracy. In case the position address A represents the vertical position on the screen, in the way described above, it is possible to obtain an address A which, for every horizontal line, represents the vertical spot position on the screen, independent on the deflection amplitude or frequency. This will be further elucidated in the description of FIGS. 4, 5, 6 and 7.

The address A in a certain line may be generated by adding the incremental value dA to the address A of a line preceding the certain line. This addition can be performed with a suitably programmed computer or with the second calculating unit 46 adapted to be a hardware adder. Also the counter 44, the first and second latches 42,43 and the first calculating unit 45 may be replaced by a suitable programmed computer.

An offset value has to be added to the initial value A0, depending on the field, if a picture is composed by interlaced fields.

The address generator 4 according to the invention also supplies an address A which is independent of the deflection amplitude or frequency if the deflection current has a shape for obtaining only an approximate linear scan on the screen instead of a substantial linear scan. This is based on the insight that the absolute accuracy is not very important, as a small difference between the actual spot position and the address A (a few lines if the address A is the vertical address) still produces an acceptable waveform. This difference causes a fixed error which will be compensated for by adjusting the shape of the waveform. In case the waveform generator is used to generate convergence waveforms, the differential accuracy of a vertical address from field to field is also not very critical, the difference should be below about one-eighth of a distance between two consecutive lines to obtain a good interlace. The differential accuracy (in case of a vertical address: from line to line) must be very high, otherwise striping occurs. As the address A is a linear function, this only imposes a condition on the number of bits used to represent the address, this number must be high enough (about 14 bits in the vertical direction) to avoid striping. It is especially this high demand on differential accuracy that makes the known ADC expensive.

Figure 4:
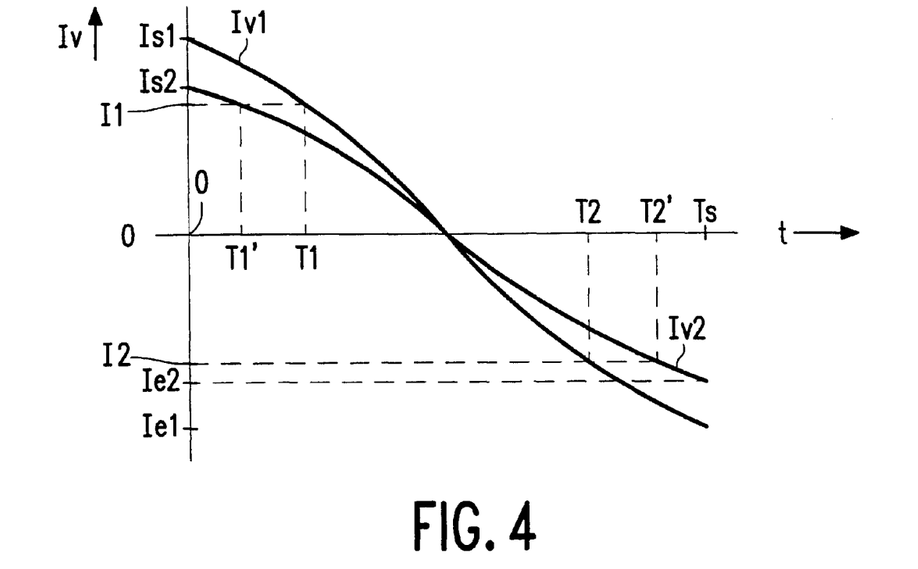
FIG. 4 shows a graph of two waveforms representing two vertical deflection currents which have different amplitudes.

FIG. 4 shows two graphs representing two vertical deflection currents Iv1,Iv2 which have different amplitudes during a scan period with a duration Ts. A first vertical deflection current Iv1 starts at moment 0 with a start current value Is1, and ends at the moment Ts with an end current value Ie1. A second vertical deflection current Iv2 starts at moment 0 with a start current value Is2<Is1, and ends at moment Ts with an end current value Ie2. As an example, both vertical deflection currents Iv1,Iv2 are S-corrected sawtooth waveforms which cause an approximately linear vertical scan on the cathode ray tube screen. The first and second vertical deflection current Iv1,Iv2 reach a first predetermined value I1 at moments T1 and T1', respectively. The first and second vertical deflection current Iv1,Iv2 reach a second predetermined value I2 at moments T2 and T2', respectively.

Figure 5:
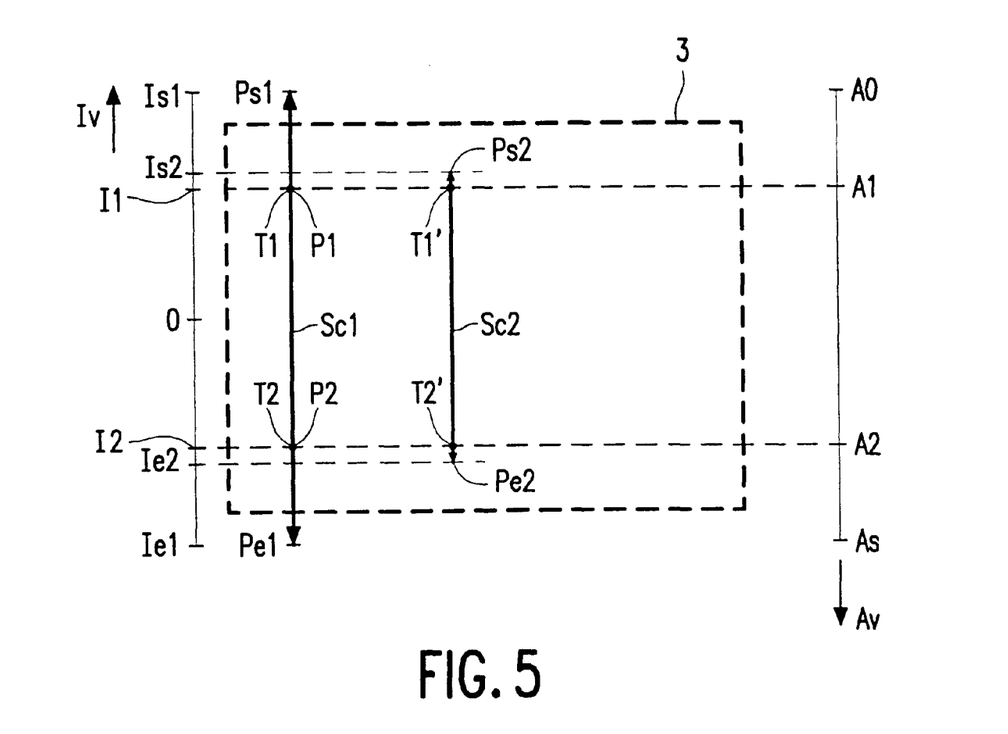
FIG. 5 shows a picture to elucidate the relation between the vertical deflection current, the vertical position on the screen and the position indication signal with respect to the two vertical deflection currents shown in FIG. 4.

FIG. 5 shows a picture to elucidate the relation between the vertical deflection current Iv, the vertical position on the screen and the position indication A with respect to the vertical deflection currents Iv1,Iv2 shown in FIG. 4. The dashed line 3 represents a cathode ray tube screen with an aspect ratio of 4:3. The line positioned left of the screen 3 indicates values of the vertical deflection current Iv. At this line are indicated: the start current Is1 and end current Ie1 related to the first vertical deflection current IV1 as shown in FIG. 4; the start current Is2 and end current Ie2 related to the second vertical deflection current Iv2; and the first and second predetermined vertical deflection current values I1,I2. A certain value of the vertical deflection current Iv corresponds in a one-to one relation to a certain vertical position on the screen 3. The first line Sc1 indicates the scanned part of the screen 3 belonging to the first vertical deflection current Iv1. The first line Sc1 starts at the vertical position Ps1 corresponding to the start current Is1, and ends at the vertical position Pe1 corresponding to the end current Ie1. In this example, the first vertical deflection current Iv1 is chosen to obtain a vertical scan larger than the height of the screen 3. The second line Sc2 indicates the scanned part of the screen 3 belonging to the second vertical deflection current Iv2. The second line Sc2 starts at the vertical position Ps2 corresponding to the start current Is2, and ends at the vertical position Pe2 corresponding to the end current Ie2. In this example, the second vertical deflection current Iv2 is chosen to obtain a vertical scan smaller than the height of the screen 3, for example, for displaying a display information with an aspect ratio of 16:9.

The predetermined vertical deflection current values I1,I2 correspond to the vertical positions P1 and P2, respectively. The references T1, T1' associated with the vertical position P1 denote the moments at which the first and the second vertical deflection currents Iv1,Iv2 reach the first predetermined value I1, respectively (see also FIG. 4). The references T2, T2' denote the moments at which the first and the second vertical deflection currents Iv1,Iv2 reach the second predetermined value I2, respectively.

The line positioned right of the screen 3 indicates values of the vertical spot position indication signal or the vertical address Av, according to the invention, in relation to the vertical position on the screen 3.

The vertical address Av generated in response to the first vertical deflection current Iv1 follows from the two equations:

$$Av(T1)=A0+dA.T1=A1$$

$$Av(T2)=A0+dA.T2=A2$$

Due to the first equation, it is ensured that at moment T1 at which the vertical current Iv has the first predetermined value I1, a vertical address Av is generated equal to a chosen value A1. Due to the second equation, it is ensured that at moment T2 at which the vertical current Iv has the second predetermined value I2, a vertical address Av is generated equal to a chosen value A2.

From these two equations, the initial and incremental values A0, dA can be calculated, the calculated values substituted in the linear function representing the vertical address Av gives:

$$Av(t)=(A1.T2-A2.T1)/(T2-T1)+t.(A2-A1)/(T2-T1)$$

wherein $Av(T1)=A1$ and $Av(T2)=A2$.

Hence, the vertical address Av(t) depends on a choice of the first and second address values A1,A2. As the first vertical deflection current Iv1 has a shape to obtain a linear vertical scan it is sufficient to lock the vertical address Av on two positions P1,P2 to the screen. All other positions on the screen will then be locked to the vertical address Av, as the vertical address Av is a linear function in time. This means that the start value A0=0 corresponds to the vertical position Ps1, and that the end value As corresponds to the vertical position Pe1.

In the following, it is elucidated that the vertical address Av, generated as described above, supplies the same address values at the same vertical positions if the amplitude of the vertical deflection current is changed.

The vertical address Av generated in response to the second vertical deflection current Iv2 follows from the two equations:

$$Av(T1')=A0+dA.T1'=A1$$

$$Av(T2')=A0+dA.T2'=A2$$

Due to the first equation, it is ensured that at moment T1' at which the vertical current Iv has the first predetermined value I1, a vertical address Av is generated equal to a chosen value A1. Due to the second equation, it is ensured that at moment T2' at which the vertical current Iv has the second predetermined value I2, a vertical address Av is generated equal to a chosen value A2.

From these two equations, the initial and incremental values A0, dA can be calculated, the calculated values substituted in the linear function representing the vertical address Av give:

$$Av(t)=(A1.T2'-A2.T1')/(T2'-T1')+t.(A2-A1)/(T2'-T1')$$

wherein $Av(T1')=A1$ and $Av(T2')=A2$.

Thus, the vertical address Av has the same first address value A1 at the first vertical position P1 at which the vertical current has the first predetermined value I1. And, the vertical address Av has the same second address value A2 at the second vertical position P2 at which the vertical current has the second predetermined value I2. As, also, the second vertical deflection current Iv2 has a shape to obtain a linear vertical scan, it is sufficient to lock the vertical address Av on two positions P1,P2 to the screen. All other positions on the screen will then be locked to the vertical address Av, as the vertical address Av is a linear function in time. So, the vertical address generator 4 generates a vertical address Av which has the same values at same positions on the screen 3 although the amplitude of the vertical deflection current Iv has been changed.

Figure 6:
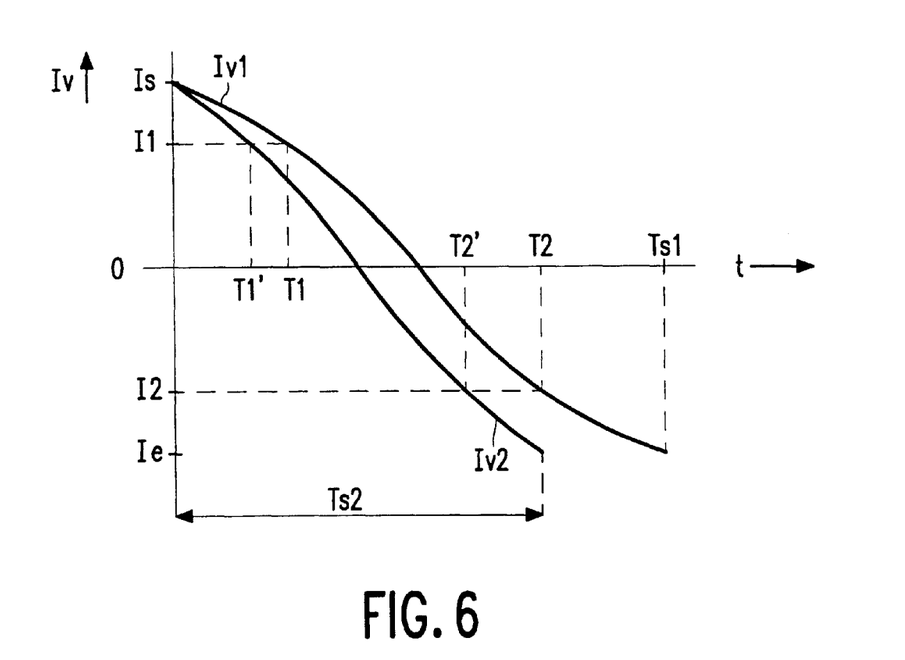
FIG. 6 shows a graph of two waveforms representing two vertical deflection currents which have a scan period with a different duration.

FIG. 6 shows a first and a second vertical deflection current Iv1,Iv2 which have a scan periods with a different durations Ts1,Ts2, respectively. The first and second deflection currents Iv1,Iv2 have the same amplitude. The first deflection current Iv1 starts at moment 0 with a start current value Is, and ends at the moment Ts1 with an end current value Ie. The second deflection current Iv2 starts at moment 0 with the same start current value Is, and ends at the moment Ts2 with the same end current value Ie. As an example, both vertical deflection currents Iv1,Iv2 are S-corrected sawtooth waveforms which cause an approximate linear vertical scan on the cathode ray tube screen. The first and second vertical deflection currents Iv1,Iv2 reach a first predetermined value I1 at moments T1 and T1', respectively. The first and second vertical deflection currents Iv1,Iv2 reach a second predetermined value I2 at moments T2 and T2', respectively.

Figure 7:
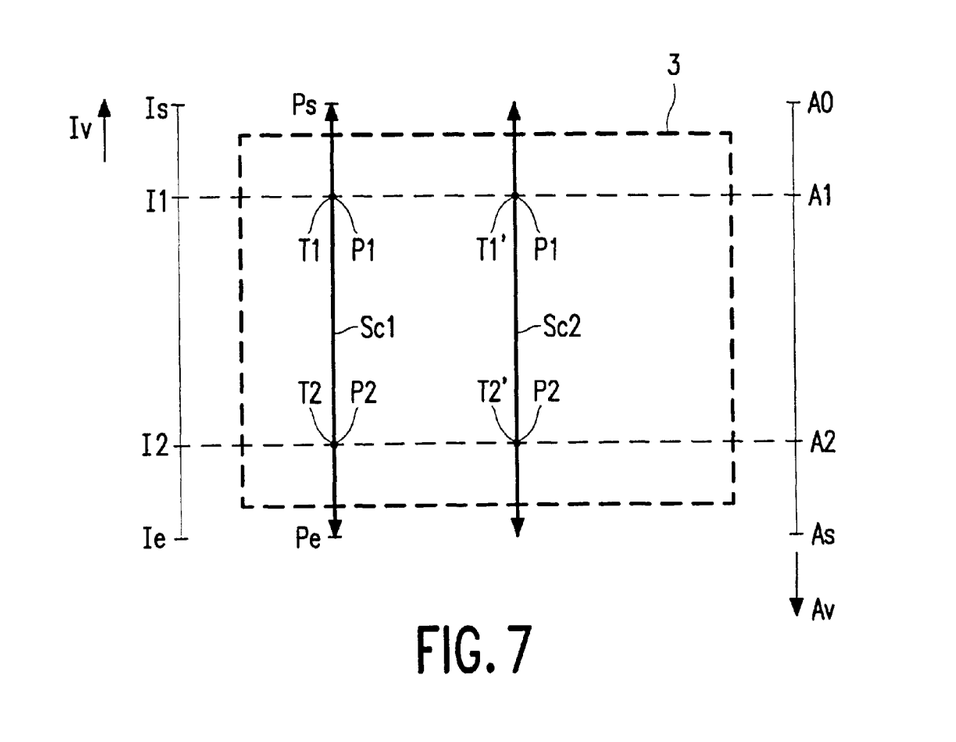
FIG. 7 shows a picture to elucidate the relation between the vertical deflection current, the vertical position on the screen and the position indication signal with respect to the vertical deflection currents shown in FIG. 6.

FIG. 7 shows a picture to elucidate the relation between the vertical deflection current Iv, the vertical position on the screen, and the position indication A with respect to the vertical deflection currents Iv1,Iv2 shown in FIG. 6. The dashed line 3 represents a cathode ray tube screen with an aspect ratio of 4:3. The line positioned left of the screen 3 indicates values of the vertical deflection current Iv. At this line are indicated: the start current Is, the end current Ie, and the first and second predetermined vertical deflection current values I1,I2. A certain value of the vertical deflection current Iv corresponds, in a one-to-one relation, with a certain vertical position on the screen 3. The first line Sc1 indicates the scanned part of the screen 3 belonging to the first vertical deflection current Iv1. The second line Sc2 indicates the scanned part of the screen 3 belonging to the second vertical deflection current Iv2. The first and second lines Sc1, SC2 both start at the vertical position Ps corresponding to the start current Is and both end at the vertical position Pe corresponding to the end current Ie.

The vertical address Av generated in response to the first vertical deflection current Iv1 follows from the two equations:

$$Av(T1)=A0+dA.T1=A1$$
$$Av(T2)=A0+dA.T2=A2$$

Again, the first and second predetermined vertical deflection current values I1,I2, occurring at the moments T1,T2, respectively, are locked to a first and a second predetermined vertical address value A1,A2, respectively. All other vertical address values are locked to a vertical position, as the vertical address Av is a linear function of time and the shape of the first vertical deflection current Iv1 causes a linear vertical scan.

The vertical address Av, generated in response to the second vertical deflection current Iv2, follows from the two equations:

$$Av(T1')=A0+dA.T1'=A1$$
$$Av(T2')=A0+dA.T2'=A2$$

Now, the first and second predetermined vertical deflection current values I1,I2, occurring at the moments T1',T2', respectively, are locked to the first and second predetermined vertical address values A1,A2, respectively. Again, all other vertical address values Av are locked to a vertical position, as the vertical address Av is linear function of time and the shape of the second vertical deflection current Iv1 causes a linear vertical scan.

Figure 8:
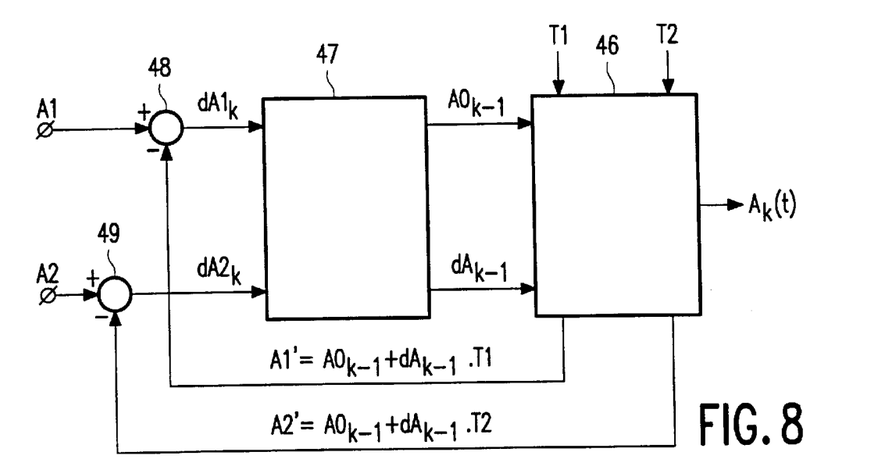
FIG. 8 shows an embodiment of a position indication signal generator according to the inventions.

FIG. 8 shows an embodiment of a position indication signal generator according to the invention. A same second calculation unit 46, as described in FIG. 1, is used. This second calculation unit 46 calculates the address $A_k(t)$ during a certain scan period designated by k. The address $A_k(t)$ is calculated as a linear function from the initial value $A0_{k-1}$ and the incremental value $dA_{k-1}$ as determined by a third calculation unit 47 during the previous scan period k-1. The second calculation unit 46 receives the moments T1, T2 at which the deflection current Ih;Iv reaches the first and second predetermined values I1, I2, respectively, during the certain scan period k. The moments T1, T2 may also be mean values of moments at which, in a number of scan periods preceding the certain scan period k, the first and second predetermined values I1, I2 occur, respectively. The second calculation unit 46 supplies the values A1', A2' of the address $A_k$ as occurring at the moments T1 and T2. The embodiment of the position indication signal generator further comprises a first and a second comparing stage 48, 49. The first comparing stage 48 compares the address value A1' with the desired address value A1 to obtain a first difference value $dA1_k$. The second comparing stage 49 compares the address value A2' with the desired address value A2 to obtain a second difference value $dA2_k$. The third calculation unit 47 calculates the initial value A0 and the incremental value dA from the first and the second difference value $dA1_k$, $dA2_k$. In a steady state situation, the first and the second difference values $dA1_k$, $dA2_k$ are zero, and the address A has the predetermined values A1,A2 at the first and the second moments T1,T2, in time. At the moments T1,T2, the deflection current values I1,I2 occur. These deflection current values I1,I2 correspond to fixed positions on the display screen. The address generator supplies the addresses A1,A2 at the moments T1,T2, and thus these addresses A1,A2 indicate the fixed positions on the display screen. In this closed loop system, it is possible to reach the steady state with the calculation performed by the third calculation unit 47 in many ways. A very effective embodiment is shown in FIG. 9.

Figure 9:
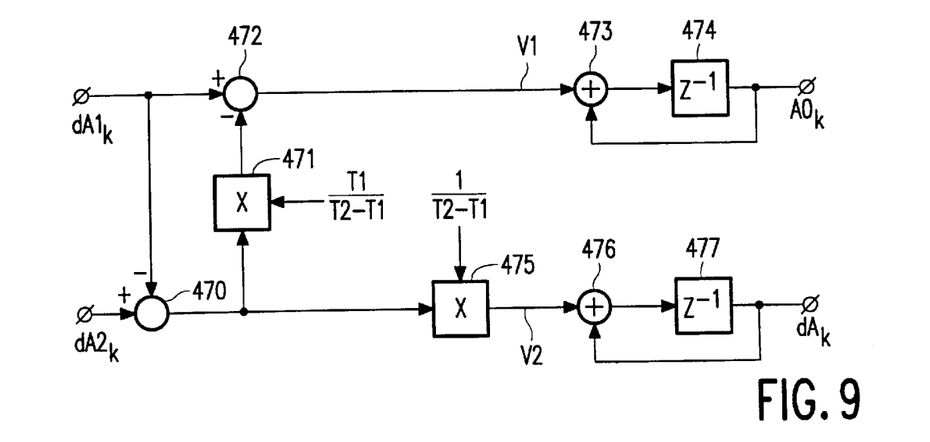
FIG. 9 shows an embodiment of a third calculation unit.

FIG. 9 shows an embodiment of the third calculation unit 47. A first subtractor 470 subtracts the first difference signal $dA1_k$ from the second difference signal $dA2_k$, and has an Output which is connected to a first input of a first multiplier 471 and to a first input of a second multiplier 475. The first multiplier 471 has a second input receiving the value T1/(T2−T1) and an output for supplying an output value which is the multiplication of the values occurring at its first and second inputs. A second subtractor 472 subtracts the output value of the first multiplier 471 from the first difference signal $dA1_k$ to obtain a value V1. The value V1 is supplied to a first time discrete integrator comprising an adder 473 and a delay or storage circuit 474. The delay or storage circuit 474 has an input which receives the addition of the value V1 and the output value of the delay or storage circuit 474. The output value of the delay or storage circuit 474 is the initial value $A0_k$. The delay or storage circuit 474 delays or stores the input value for at least one scan period. The second multiplier 475 has a second input receiving the value 1/(T2−T1) and an output for supplying an output value V2 which is the multiplication of the values occurring at its first and second inputs. The value V2 is supplied to a second time discrete integrator comprising an adder 476 and a delay or storage circuit 477. The second time discreet integrator supplies the incremental value $dA_k$ and is arranged and operates in the same manner as the first time discreet integrator 474.

Figure 10:
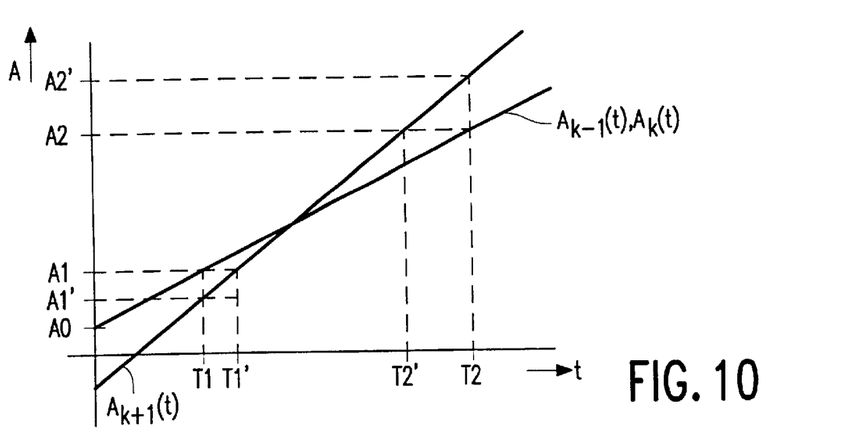
FIG. 10 shows a diagram of the position indication signal to elucidate the operation of the embodiment, of the position indication signal generator of FIG. 8.

FIG. 10 shows a diagram of the address A(t) to elucidate the operation of the embodiment of the position indication signal (address) generator of FIG. 8, which comprises a calculation unit 47 as shown in FIG. 9.

It is assumed that the address generator is in a steady state situation up to and including a scan period k−1. During the scan period k−1, the address generator supplies an address $A_{k−1}(t)$ which is locked to the deflection current Iv;Ih as, the address $A_{k−1}(t)$ has the desired value A1 at moment T1 at which the deflection current Ih;Iv has the predetermined value I1, and the address $A_{k−1}(t)$ has the desired value A2 at moment T2 at which the deflection current Ih;Iv has the predetermined value I2.

During the next scan period k, it appears that the deflection current Ih;Iv changed in amplitude or duration. Despite this change of the deflection current Ih;Iv, the address $A_k(t)$, during the next scan period k, is calculated by the second calculating unit 46 by using the initial value $A0_{k−1}$ and the incremental value $dA_{k−1}$ as calculated by the third calculating unit 47 during the scan period k−1, these values can be written as:

$$A0_{k−1}=(A2.T1−A1.T2)/(T1−T2)$$

$$dA_{k−1}=(A1−A2)/(T1−T2)$$

This gives rise to the address values A1 and A2 at the moments T1 and T2.

However, during this next scan period k, the changed deflection current Ih;Iv reaches the predetermined values I1, I2 at the moments T1' and T2', respectively. The second calculating unit 46 stores the address values occurring at these moments T1',T2' as:

$$A_k(T1')=A0_{k−1}+dA_{k−1}.T1'=A1'$$

$$A_k(T2')=A0_{k−1}+dA_{k−1}.T2'=A2'$$

The difference values $dA1_k, dA2_k$ between the address values A1',A2', as occurring at the moments T1',T2', and the desired address values A1,A2 is determined by the first and second subtractors 48, 49. The difference values $dA1_k, dA2_k$ can be written as:

$$dA1_k=A1−A1'=A1−A0_{k−1}−dA_{k−1}.T1' \quad (1)$$

$$dA2_k=A2−A2'=A2−A0_{k−1}−dA_{k−1}.T2' \quad (2)$$

The third calculating unit 47 calculates from these difference values $dA1_k, dA2_k$ an initial value $A0_k$ and, an incremental value $dA_k$ for use in the succeeding scan period k+1. The address generator would be locked to the deflection current Ih;Iv as desired, if during the scan period k+1, it would be valid:

$$A_{k+1}(T1')=A1=A0_k+dA_k.T1'$$

$$A_{k+1}(T2')=A2=A0_k+dA_k.T2'$$

Because, in this case, it again is valid that addresses A1,A2 correspond to the fixed positions on the screen which are determined by the predetermined values I1,I2 of the deflection current Ih,Iv, respectively. From these two equations, it follows that the initial value $A0_k$ and the incremental value $dA_k$ should be calculated by the third calculating unit 47 to be:

$$A0_k=(A2.T1'−A1.T2')/(T1'−T2')$$

$$dA_k=(A1−A2)/(T1'−T2')$$

So, if this initial value $A0_k$ and incremental value $dA_k$ are the outcome of the calculation performed by the third calculation unit 47 before the start of the scan period k+1, then, the address $A_{k+1}(t)$ calculated by the second calculation unit 46 during the scan period k+1 is locked to the position on the display screen. This has as a consequence that the address values occurring at the moments T1' and T2' equal the values A1 and A2, respectively. So, the difference values $dA1_{k+1}$, $dA2_{k+1}$ are zero during the scan period k+1:

$$dA1_{k+1}=A1−A0_k−dA_k.T1'=0 \quad (3)$$

$$dA2_{k+1}=A2−A0_k−dA_k.T2'=0 \quad (4)$$

Substitution of the address values A1,A2 according to the equations (3) and (4) in the equations (1) and (2) gives:

$$dA1_k=A0_k−A0_{k−1}+(dA_k−dA_{k−1}).T1' \quad (5)$$

$$dA2_k=A0_k−A0_{k−1}+(dA_k−dA_{k−1}).T2' \quad (6)$$

From these two equations follow the initial value $A0_k$ and the incremental value $dA_k$ written in terms of the difference values $dA1_k, dA2_k$:

$$A0_k=A0_{k−1}+(dA1_k.T1'−dA2_k.T2')/(T2'−T1')$$

$$dA_k=dA_{k−1}+(dA1_k−dA2_k)/(T1'−T2')$$

Therefore, with the embodiment of the third calculating unit 47 as shown in FIG. 9, the address generator is locked to the changed deflection current Ih:Iv at two values I1,I2 of the deflection current Ih;Iv in the scan period next to the scan period in which the deflection current changed. Because the deflection current has a shape to obtain an approximate linear scan on the display screen, the linear address generator is locked to the position on the display screen.

The generation of an amplitude and frequency independent address A, as described above, can also be used in conjunction with so called transposed scanned cathode ray tubes whereby vertical scanned lines succeed in horizontal direction.

What is claimed is:

1. In a cathode ray tube display arrangement in which displays are realized by line-by-line scanning of a display screen of a cathode ray tube by an electron beam spot, the cathode ray tube display arrangement comprising a deflection circuit for generating a repetitive deflection current to deflect the electron beam spot in a first direction, wherein the deflection current has a shape for obtaining an approximate linear scan on the display screen in the first direction during a scan period, a method for generating a spot position indication signal for indicating a position of said spot on the display screen, characterized in that the method comprises the steps:

generating, in a certain scan period, a position information related to the deflection current;

measuring a first instant as an instant at which the position information has a first value;

measuring a second instant as an instant at which the position information has a second value; and calculating, in a later scan period, the spot position indication signals a linear function in time whereby, in a steady state situation, the spot position indication signal has predetermined position indication values at instants in this later scan period corresponding to the first and the second instants, respectively, and the spot position indication signals independent of a width of the scan or the number of scanning lines.

2. A method as claimed in claim 1, characterized in that the steps of measuring the first and second instants comprise the steps:

generating count values indicative of periods of time;

storing a first count value of said count values in response to detecting that the position information has the first value, the first count value being representative of the first instant; and storing a second count value of said count values in response to detecting that the position information has the second value, the second count value being representative of the second instant.

3. A method as claimed in claim 1, characterized in that the step of calculating the spot position indication signal in the certain scan period as a linear function in time comprises calculating:

$$A(t)=A0+dA.t,$$

wherein A0 is an initial position indication value and dA is an incremental value which are determined by calculating:

$$A0=(T1.A2-T2.A1)/(T1-T2), \text{ and}$$
$$dA=(A1-A2)/(T1-T2),$$

wherein T1 is the first instant, T2 is the second instant, and A1 and A2 are the predetermined position indication values at the first and second instants, respectively.

4. A method as claimed in claim 1, characterized in that the method further comprises the steps:

determining a first value of the spot position indication signal at the first instant;

determining a second value of the spot position indication signal at the second instant; and comparing the first and the second values with the predetermined position indication values, respectively, to obtain difference values, whereby the step of generating the spot position indication signal in the later scan period as a linear function in time comprises calculating:

$$A(t)=A0+dA.t,$$

wherein A0 is an initial position indication value and dA is an incremental value, the initial position indication value and the incremental value being determined based on the differences values to obtain, in a steady state situation, the spot position indication signal having predetermined position indication values at the first and the second instants, respectively.

5. A method as claimed in claim 3, characterized in that the spot position indication signal indicates a vertical position of horizontally scanned lines, and wherein the step of calculating the position indication signal comprises summing the incremental value to a value of the spot position indication signal representing the position of a line to form the spot position indication signal of a succeeding line.

6. A circuit for generating a spot position indication signal for indicating a position of said spot on a display screen, the circuit receiving a deflection current for scanning an electron beam spot in a first direction along a display screen of a cathode ray tube line by line, wherein the deflection current has a shape for obtaining an approximately linear scan on the display screen in said first direction, characterized in that the circuit comprises:

means for generating, in a certain scan period, a position information related to the deflection current;

means for measuring a first instant at an instant at which the position information has a first value;

means for measuring a second instant at an instant at which the position information has a second value; and means for calculating, in a later scan period, the spot position indication signal as a linear function in time whereby, in a steady state situation, the spot position indication signal has predetermined position indication values at instants in this later scan period corresponding to the first and the second instants, respectively, and the spot position indication signal is independent of a width of the scan or the number of scanning lines.

7. A cathode ray tube display apparatus in which displays are realized by line-by-line scanning of a display screen of a cathode ray tube by an electron beam spot, the cathode ray display apparatus comprising:

a deflection circuit receiving a horizontal or a vertical position signal for generating a deflection current for deflecting the electron beam spot in a first direction, wherein the deflection current has a shape for obtaining an approximate linear scan on the display screen in said first direction; and a circuit for generating a spot position indication signal for indicating a position of said spot on the display screen, characterized in that the circuit for generating a spot position indication signal comprises:

means for generating, in a certain scan period, a position information related to the deflection current;

means for measuring a first instant as an instant at which the position information has a first value;

means for measuring a second instant as an instant at which the position information has a second value; and means for calculating, in a later scan period, the spot position indication signal as a linear function in time whereby, in a steady state situation, the spot position indication signal has predetermined position indication values at instants in this later scan period corresponding to the first and the second instants, respectively, and the spot position indication signal is independent of a width of the scan or the number of scanning lines.

8. A method as claimed in claim 4, characterized in that the spot position indication signal indicates a vertical position of horizontally scanned lines, and wherein the step of calculating the position indication signal comprises summing the incremental value to a value of the spot position indication signal representing the position of a line to form the spot position indication signal of a succeeding line.

* * * * *